(12) United States Patent
Hobson

(10) Patent No.: US 9,742,137 B2
(45) Date of Patent: Aug. 22, 2017

(54) METHOD FOR AUTOMATED SPLICING AND TERMINATING LOW, MEDIUM, HIGH, AND EXTRA HIGH VOLTAGE CABLES

(71) Applicant: ABB Technology AG, Zurich (CH)

(72) Inventor: Robert Wayne Hobson, Cornelius, NC (US)

(73) Assignee: NKT HV Cables GmbH, Baden (CH)

( * ) Notice: Subject to any disclaimer, the term of this patent is extended or adjusted under 35 U.S.C. 154(b) by 172 days.

(21) Appl. No.: 14/563,082

(22) Filed: Dec. 8, 2014

(65) Prior Publication Data

US 2016/0164238 A1    Jun. 9, 2016

(51) Int. Cl.

| | | |
|---|---|---|
| *H01R 43/00* | (2006.01) |
| *H01R 43/16* | (2006.01) |
| *B29C 67/00* | (2017.01) |
| *H02G 1/14* | (2006.01) |
| *H02G 15/18* | (2006.01) |
| *B29L 9/00* | (2006.01) |
| *B29L 31/34* | (2006.01) |
| *B29K 101/00* | (2006.01) |
| *B33Y 10/00* | (2015.01) |
| *B33Y 30/00* | (2015.01) |
| *B33Y 50/02* | (2015.01) |

(52) U.S. Cl.
CPC ......... *H01R 43/16* (2013.01); *B29C 67/0055* (2013.01); *B29C 67/0088* (2013.01); *H02G 1/14* (2013.01); *H02G 15/1826* (2013.01); *B29K 2101/00* (2013.01); *B29L 2009/00* (2013.01); *B29L 2031/3462* (2013.01); *B33Y 10/00* (2014.12); *B33Y 30/00* (2014.12); *B33Y 50/02* (2014.12); *Y10T 29/49194* (2015.01)

(58) Field of Classification Search
CPC ........... Y10T 74/19251; Y10T 29/5187; Y10T 29/49194; Y10T 29/49149; G02B 6/2553; G02B 6/2555; G02B 6/4454; B33Y 10/00; B33Y 50/02; H01B 13/345; H01R 43/28
USPC ................. 29/869, 828, 857, 864, 868, 873; 264/1.25, 40.1, 308
See application file for complete search history.

(56) References Cited

U.S. PATENT DOCUMENTS 4,512,828 A * 4/1985 Helm ....................... H02G 1/14
140/115
2015/0137398 A1* 5/2015 Perez ................... G02B 6/2553
264/1.25

* cited by examiner

*Primary Examiner* — Thiem Phan
(74) *Attorney, Agent, or Firm* — Taft Stettinius & Hollister LLP

(57) ABSTRACT

A system and method for additively manufacturing splices and terminations for extra high, high, medium and low voltage power cable includes providing an additive manufacturing machine having at least one print head. Cable ends can be secured within a chamber from which atmospheric air can be evacuated and replaced with non-oxidizing gas. A scanning device can determine the composition and position of the various constituents of the cable ends, from which information a controller can determine the printing sequence and print a termination or splice portion.

13 Claims, 4 Drawing Sheets

METHOD FOR AUTOMATED SPLICING AND TERMINATING LOW, MEDIUM, HIGH, AND EXTRA HIGH VOLTAGE CABLES

FIELD OF INVENTION

The present disclosure concerns termination and splicing of electrically conductive cables, and in particular low, medium, high, and extra high voltage cables.

BACKGROUND

Splicing and termination of low, medium, high, and extra high voltage electrical cables has involved preparing a single cable end in the case of termination, or preparing two cable ends in the case of splicing. Preparation of the cable ends included removing a part of each of the layers of the cables in a specific order and in specific amounts. The conductor in the cables was then crimped to a connector appropriately sized for the conductor. Next, rolls of tape, an engineered splice, or termination kit was used to build a splice or termination that would grade the electrical stress resulting from the structure of the prepared ends of the cables. Available kits can provide sufficient protection from the environment by at least partial reconstruction of certain layers of the cable or by providing at least functional replacement of the layers of the cable through a specialized joint or termination assembly. Installation of such splicing or termination kits or manual reconstruction of cable layers has required trained personnel to manually perform the required tasks, raising the potential for human error that could compromise the splice or termination. Furthermore, use of manual splicing and termination techniques can result in undesirably long and costly timeframes for completion.

SUMMARY

A system and method for additively manufacturing splices and terminations for extra high, high, medium and low voltage power cable includes providing an additive manufacturing machine having at least one print head. Cable ends can be secured in a chamber in which a controlled environment can be achieved including one evacuated of atmospheric air and filled with gasses, including but not limited to non-oxidizing gas and conductive gas, powder or a vacuum. A scanning device can determine the material and position of the various constituents of the cable ends, providing a map of the surface on which the termination or splice will be built. From the information gathered concerning the cable, a controller can determine the printing sequence and print a termination or splice portion. Robots can be incorporated with a variety of end effectors to perform manufacturing and finishing steps in addition to the additive printing. In addition to printing processes, other processes can be performed including but not limited to arc vapor deposition and electrostatic painting. Image information can be maintained for quality control purposes and for evaluation of the printing process, including during printing.

BRIEF DESCRIPTION OF THE DRAWINGS

In the accompanying drawings, structures and methods are illustrated that, together with the detailed description provided below, describe aspects of a system and method for automated splicing and terminating low, medium, high, and extra high voltage cables. It will be noted that a single component may be implemented as multiple components or that multiple components may be implemented as a single component. The figures are not drawn to scale and the proportions of certain parts have been exaggerated for convenience of illustration. Further, in the accompanying drawings and description that follow, like parts are indicated throughout the drawings and written description with the same reference numerals, respectively.

DETAILED DESCRIPTION

Figure 1:
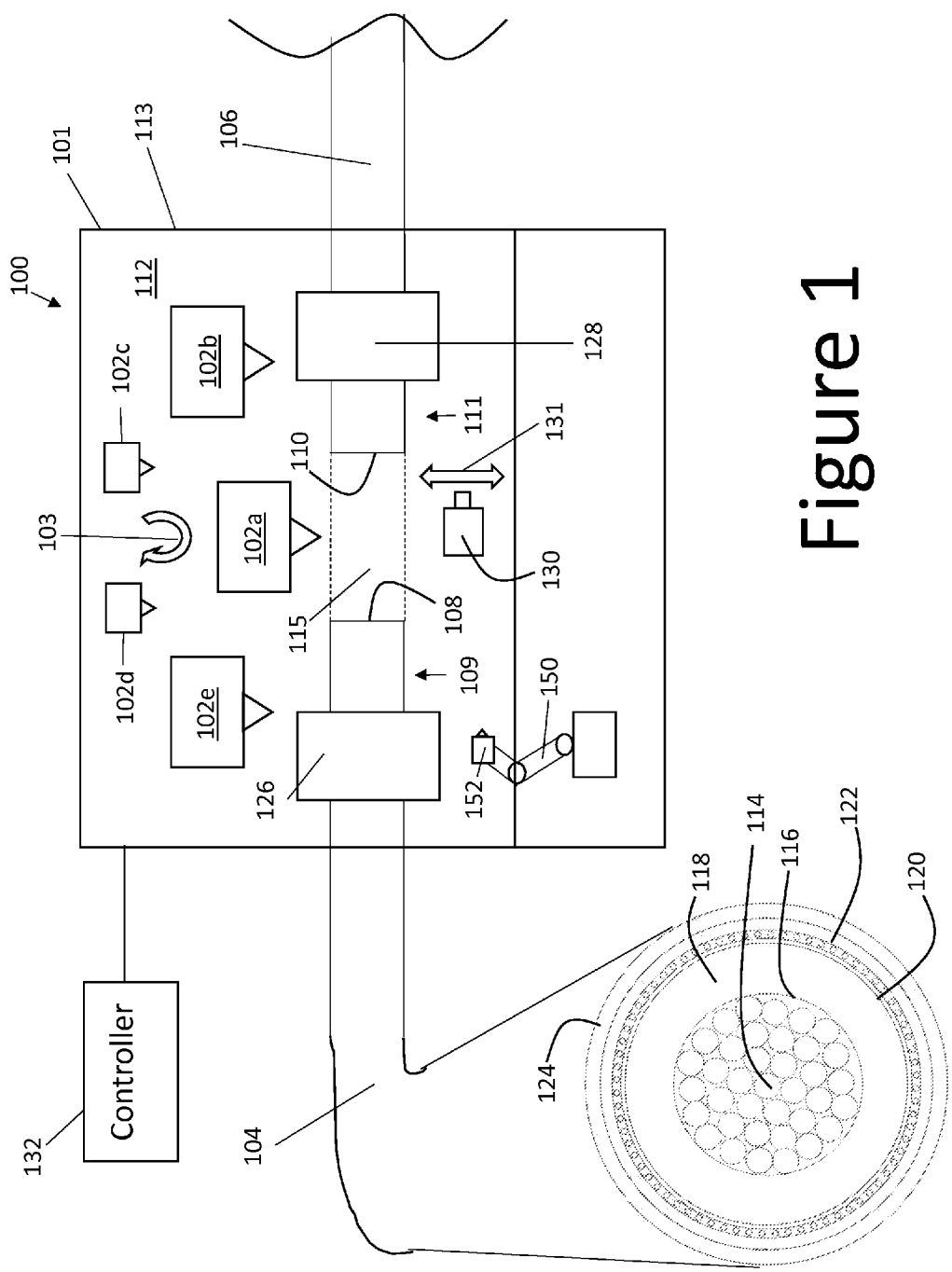
FIG. 1 illustrates a diagram of additive manufacturing system 100.

With reference to FIG. 1, an additive manufacturing system 100 includes an additive manufacturing machine 101 having multiple build heads 102a-102e. Each of the build heads 102 can be selectively positioned to apply specific materials during additive manufacturing processes. As indicated by arrow 103, the build heads 102 can be rotated into and out of printing position. In FIG. 1, build head 102a is in a printing position, from which position the particular build head 102 can apply a specific material during the operations described herein. Once the build head 102a has completed its allotted depositions of the splice or termination, build head 102a can be rotated out of the printing position and swapped with another of build heads 102b-102e, which can be rotated into printing position. While FIG. 1 depicts five build heads 102a-102e, more or less than five build heads 102 can be implemented according to the present teachings, including a single build head capable of printing several different materials, including plastics and metals. The cables 104, 106 have terminal faces 108, 110, disposed at ends 109, 111, respectively. The ends 109, 111 are disposed in the chamber 112 of the machine 101 during the printing process. Chamber 112 is formed at least in part by selectively openable cover 113, which allows access to the cable ends 109, 111. Splicing chamber 112 can allow for a controlled environment, such as when atmospheric air is purged from the chamber 112 and replaced with inert gas such as nitrogen or argon gas in order to provide a non-oxidizing environment for printing to take place. Other forms of controlled environments can involve filling the chamber 112 with non-inert gases, liquids, solid powders, including powders that are consumed during the printing process, or a vacuum. According to one aspect of the present teachings, the cable terminal ends 109, 111 are cut to produce a face 108, 110 in preparation for material printing. In the illustrated case, the cuts form flat faces 108, 110 perpendicular to the longitudinal axis of the respective cable 104, 106 as it is aligned near ends 109, 111. Such a square cut can prepare the ends 109, 111 of cables 104, 106 for the additive manufacturing processes described herein. In other alternatives according to the present teachings, faces having forms and shapes other than square faces can be cut from the cables ends 109, 111, in preparation for printing, including but not limited to triangular cuts, V-shaped cuts or stair stepped cuts.

According to one aspect of the present teachings, the additive manufacturing machine 101 prints each of the layers of the cables 104, 106 in the gap between terminal ends 108, 110 to form a splice portion 115. The machine 101 can start printing with the conductor 114. After completion of the conductor 114 in the splice portion 115, the machine 101 prints, in sequence and to completion, the conductor shield 116, the insulation 118, the insulation shield 120, the shield metallic layer 122, which can include reinforcing wires, and finally the outer jacket 124. The same layers, having the same relative radial position and composition, are found in both illustrated cables 104, 106. According to another aspect of the present teachings, the materials deposited by the respective build heads 102 of the machine 101 can be the same as the materials in the layers of cables 104, 106. According to another aspect of the present teachings, heat or lasers can be applied to the deposited materials that require cross-linking, such as an insulation including cross-linked polymers, including but not limited to cross-linked polyethylene (XLPE). Heat or lasers can also be applied to melt any metals or plastics that require melting, which melting can include cross-linking plastics as necessary. Melting or cross-linking can occur as the respective materials are deposited between terminal ends 108, 110 to form splice portion 115, or after some predetermined amount of the subject material is deposited. A laser or heat element included with the build heads 102, or other heat source, can apply the necessary heat required to melt any deposited metal, such as the metal in conductor 114, or activate a catalyst that causes the cross-linking of plastic materials. Materials including but not limited to conductors, ethylene propylene rubber (EPR), ethylene propylene diene monomer (EPDM), silicone, water swellable tapes, and other materials can be printed with build heads 102. The ends 109, 111 of the cables can be secured to the machine 101 at securing members 126, 128. The securing members can secure the cables 104, 106 to prevent both longitudinal movement and rotational movement. Prevention of rotational movement can be beneficial when the cables 104, 106 are not continuously symmetric about their radial center, such as a Milliken conductor or a trefoil conductor, which have an integer number of rotational degrees of symmetry.

A detection device 130 can be used to identify the various layers of the cables 104, 106. Such a device 130 can, for example, include a position sensor in combination with imaging equipment, such as a multispectral cameras capable of capturing images in various electromagnetic spectral ranges, including infrared, ultraviolet, or visible light. Device 130 can also include a position sensor in combination with a display module permitting an operator to identify positions of various portions of the cables 104, 106. Adjustments can be made to the positions and orientations of the cables 104, 106 based on the information obtained through use of the detection device 130. The detection device 130 can move across the faces 108, 110, as depicted by arrow 131, in order to determine the positions of the various layers of the cables 104, 106, effectively obtaining a map of the faces 108, 110. The information concerning the composition and positions of the layers of cables 104, 106 can be supplied to controller 132, which can be a general purpose computer or programmable logic controller (PLC) that can include non-transient memory, storage, processors, input and output ports, communications ports, and other components. It should be noted that other forms of computing devices can be implemented, such as a neural computer. The information concerning the positions and compositions of the layers of cables 104, 106 can be supplied to controller 132 through use of other devices, such as a measuring microscope, or a manually operated position detectors. Numerous forms of control of the printing sequence of operations can be implemented according to the present teachings, including but not limited to electromechanical and mechanical controllers. Control of the printing sequence can also be accomplished manually, including by manual input of all or a subset of the printing operations into controller 132. According to another aspect of the present teachings, the controller 132 includes instructions to clean the machine 101, including build heads 102, before the printing process, during the printing process, after the printing process, or any combination of the three.

The controller 132 can also record and log imaging data. Controller 132 can include image processing equipment and software. Image data can be fed from detection device 130 to controller 132, where it can be used in differentiating the layers of the cables 104, 106, and also for quality control, such as in identifying voids or failed deposition. According to another aspect of the present teachings, image data logged over the printing process can be selectively viewed during or after the process in order to evaluate the printing process and also to detect faults during the printing process and correct such faults. For example, upon detection of the faults, an end effector 152 of robot 150 can remove the targeted portions and re-print the removed deposits of the splice portion 115. According to another aspect of the present teachings, the controller 132 can log manufacturing data, such as position of the deposition, and process data such as voltage, amps, material flow rates, or other variables in association with the image data.

Additional information can be input directly into the controller 132 without measurement, such as a three-dimensional model of the splice portion 115 that will span the space between faces 108, 110, a model of the cables 104, 106 or a model of the faces 108, 110. The controller 132 can determine the three-dimensional structure of the splice portion 115 by extrapolating from the structure of one or both faces 108, 110. The controller can determine through operation of an algorithm, or be supplied with, the structure of a splice portion 115 that will result in a longitudinally homogenous cable when added between faces 108, 110. The cross-sectional structure in the splice portion 115 built up between faces 108, 110 will match that found in the remainder of the cables 104, 106. Under circumstances where the faces 108, 110 have dissimilar cross-sectional structure, such as where one or more layers have a different size on one face 108, 110 relative to the other, the controller 132 can extrapolate a splice portion 115 that transitions between the two different cable sizes. In another aspect of the present teachings, the intermediate structure between dissimilar faces 108, 110 is provided to the controller 132. Once information concerning the arrangement of the layers at faces 108, 110 is obtained, the controller 132 can operate the build heads 102 to incrementally print small amounts of material, gradually building up the splice portion 115 of cable between faces 108, 110.

In addition to build heads 102, a robot 150 can be implemented to apply a variety of materials and perform manufacturing steps in addition to the additive manufacturing performed, in part, by build heads 102. An end effector 152 can apply tapes, wires or other materials, or can perform vapor deposition, or painting including electrostatic painting. According to another aspect of the present teachings, the end effector can perform cleaning steps including but not limited to application of solvents or other cleaning fluids.

Figure 2:
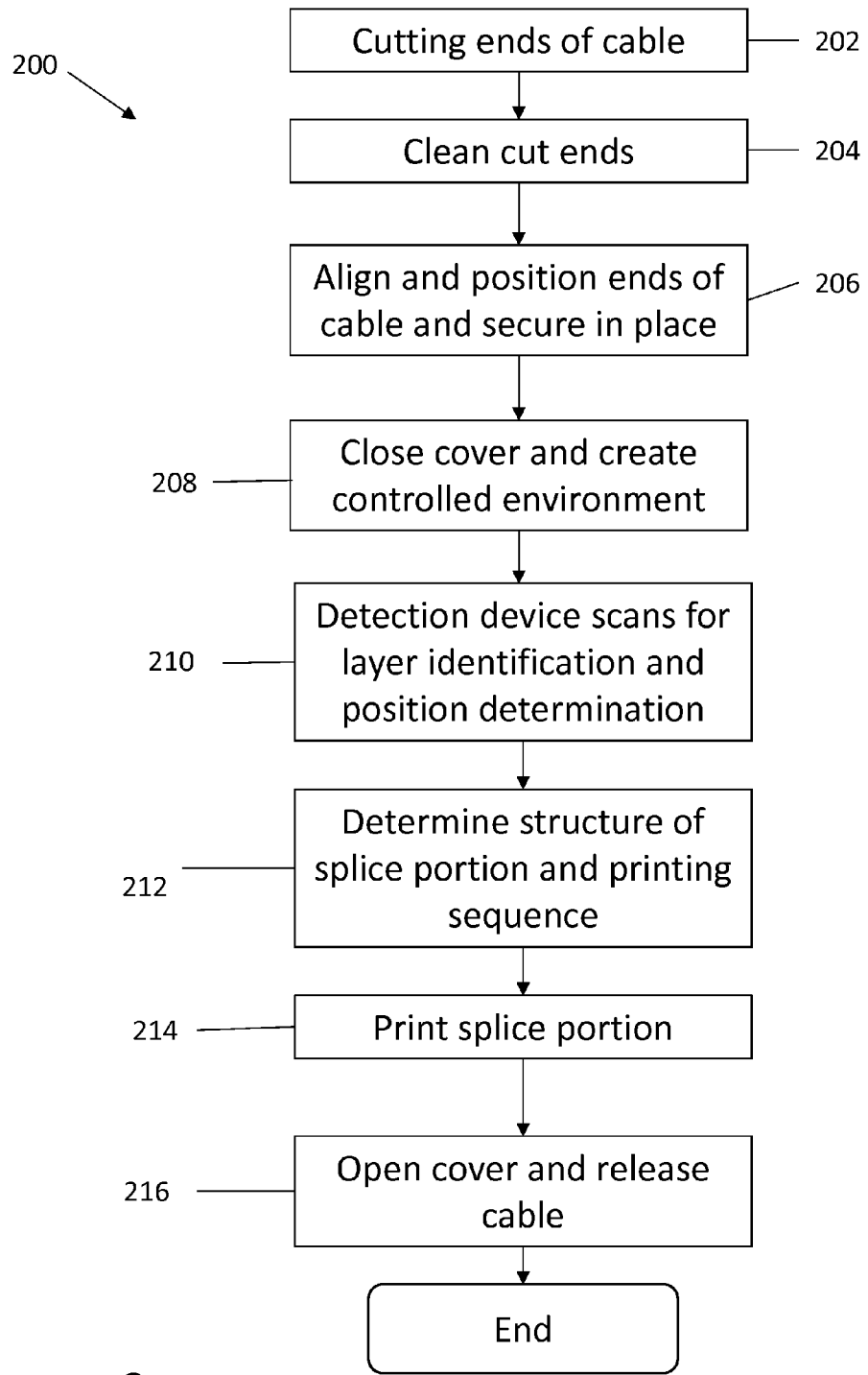
FIG. 2 illustrates a process 200 for additively manufacturing a splice portion 115.

With reference to FIG. 2, a cable splicing process 200 according to the present teachings can include step 202, which includes cutting the cables 104, 106 at the ends 109, 111 of the cables, to form faces 108, 110, which are, for example, flat and perpendicular to the direction of the cables 104, 106. Such cuts can be made with mechanical cutting devices, and can be done after securing the cables 104, 106 to the securing members 126, 128, or before. If the cutting is performed after securing cables 104, 106 to securing members 126, 128, any adjustments to the rotational and axial position of the cables 104, 106 can be performed after cutting. In step 204, both faces 108, 110 are cleaned with a suitable cleaner to remove any debris that for example can result from the cutting process performed in step 202. This step can be performed by the machine 101 operator or automatically by the machine 101 itself. In step 206, the ends 109, 111 are aligned relative to one another and locked into position with the securing members 126, 128. Rotational alignment can be performed when the cables 104, 106 are not continuously rotationally symmetric, such as a Milliken conductor or trefoil conductor. For a Milliken cable, the rotational adjustment can be made to properly orient the wedge-shaped conductors, whereas in the trefoil cable the cable faces are properly oriented so that the three internal conductors are in the correct relative rotational position.

In step 208, cover 113 is closed, forming the splicing chamber 112. Splicing chamber 112 can allow for a controlled environment, such as when atmospheric air is purged from the chamber 112 and replaced with inert gas such as nitrogen or argon gas in order to provide a non-oxidizing environment for printing to take place. Other forms of controlled environments can involve filling the chamber 112 with non-inert gases, liquids or solid powders.

In step 210 the detection device 130 scans the faces 108, 110 of the cables 104, 106 to identify the various layers present in the cables 104, 106 and their positions. In step 212, the controller 132, based on the information gathered in step 210, determines the composition and location of material to be printed in splice portion 115, and the printing sequence resulting in each incremental deposit of material. In one aspect of the present teachings, each incremental deposit in the printing sequence can be represented by $\{i, M_i, X_i, Y_i, Z_i, P1_i, P2_i, \ldots, Pk_i\}$, where i is the index number ranging from 1 to N where N is the total number of incremental printing deposits made by machine 101, $M_i$ is the material for index i, $X_i$, $Y_i$, and $Z_i$ are the coordinates for the ith deposit, and $P1_i, P2_i, \ldots, Pk_i$ are additional parameters such as a level of heat applied and time delay until the next deposit is made in the printing sequence. Such an approach can also be extrapolated to continuous printing by ensuring the increments are sufficiently numerous so as to approximate a continuous printing process.

In step 214, the build heads 102 can print the layers of the splice portion 115 between faces 108, 110. According to one aspect of the present teachings, the build heads 102 first print the conductor in the splice portion to completion, joining the conductor 114 in cable 104 and conductor 114 in cable 106. This can be done by building up conducting material from the radial center of the conductor 114 at faces 108, 110. As one non-limiting example, the print heads 102 print projections, for example conical mounds, from each face 108, 110 that join together in the region between faces 108, 110. Once the printed conductors are first joined together, for example, when the first deposit is printed contiguous with the conductor built up from each of the faces 108, 110, the remainder of the conductor 114 in the splice portion 115 can be built up radially to completion. Once the conductor 114 in the splice portion is complete, the machine 101 can print the next radially adjacent layers to completion, with each layer printed to completion prior to commencing printing of subsequent layers. Other printing sequences can be implemented, including ones incorporating faces 108, 110 having different starting shapes. According to one aspect of the present teachings, tapering faces 108, 110 such that each face is planar and has a normal projection angled upward, toward the build heads 102 relative to the longitudinal axis of the cables 104, 106 at the ends 109, 111. In such a V-shaped configuration, the printing can be undertaken with the outer layers of the splice portion 115 distal to the print heads 102 printed first, with the remainder of the splice portion 115 built up toward the build heads rather than radially outward from the center of the faces 108, 110. According to one aspect of the present teachings, the printing sequence is chosen so as to prevent inadvertent deposition of material or other disruption, such as overspray or inadvertent coating of exposed portions of the cables 104, 106. The controller 132 can also detect with the detection device 130 in real-time whether such undesirable deposition or overspray occurs. In step 216, after the outermost layer of the splice portion 115 has been completely printed, the cover 113 is opened and the ends 109, 111, now part of a contiguous cable, are released from securing members 126, 128.

Figure 3:
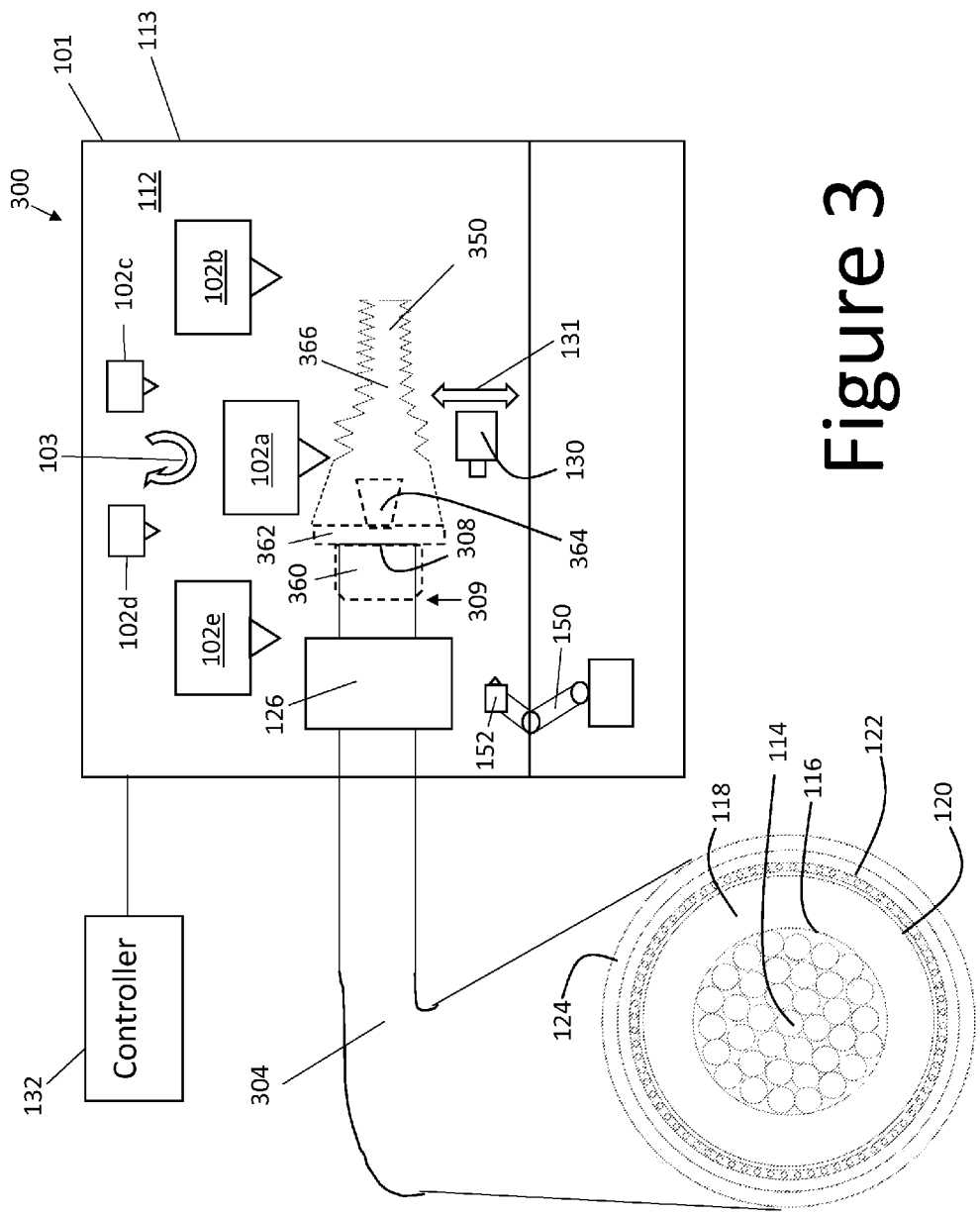
FIG. 3 illustrates a diagram of additive manufacturing system 300.

In addition to splicing, additive manufacturing can be implemented to provide cable terminations. With reference to FIG. 3, system 300 for terminating a cable 304 includes single cable 304 secured within additive manufacturing machine 101. Securing member 128 has been removed as it is not in use when printing cable termination 350. The cable 304 includes layers similar to cable 104 and is secured to securing member 126 at cable end 309. Face 308 is cut and cleaned similarly to face 108. The machine 101 can then print a termination 350 on the secured end 309 of cable 304. The three-dimensional structure of the termination 350 can be input into controller 132, which can then convert such information into a printing sequence that includes the order of the incremental deposits of material, the selection of the material and the location of the incremental deposits during the printing sequence. According to another aspect of the present teachings, the sequence required to print the termination 350 is directly input into the controller 132. According to still another aspect of the present teachings, control of the printing sequence can be done manually.

With continued reference to FIG. 3, the additive manufacturing machine 101 can build aspects of a termination 350 for the cable 304 such as collar 360, pressure ring 362, stress cone 364 and insulator 366. It should be noted that other forms of stress control, insulation, and other structures can be printed to form a custom cable termination 350. The termination 350 can be printed on the cable face 308 and cable end 309. When the process of printing the termination 350 is complete, the termination 350 is structurally and electrically a copy of a standard cable termination. It should be noted that additional features of a complete termination can be added after completion of the printing process, such as clamps, connectors, and including aspects that could otherwise be printed such as insulation 366. Such features can be applied, for example, by end effector 152 of robot 150. After completion, the cover 113 opens and the machine can release the cable 304 from securing member 126.

Figure 4:
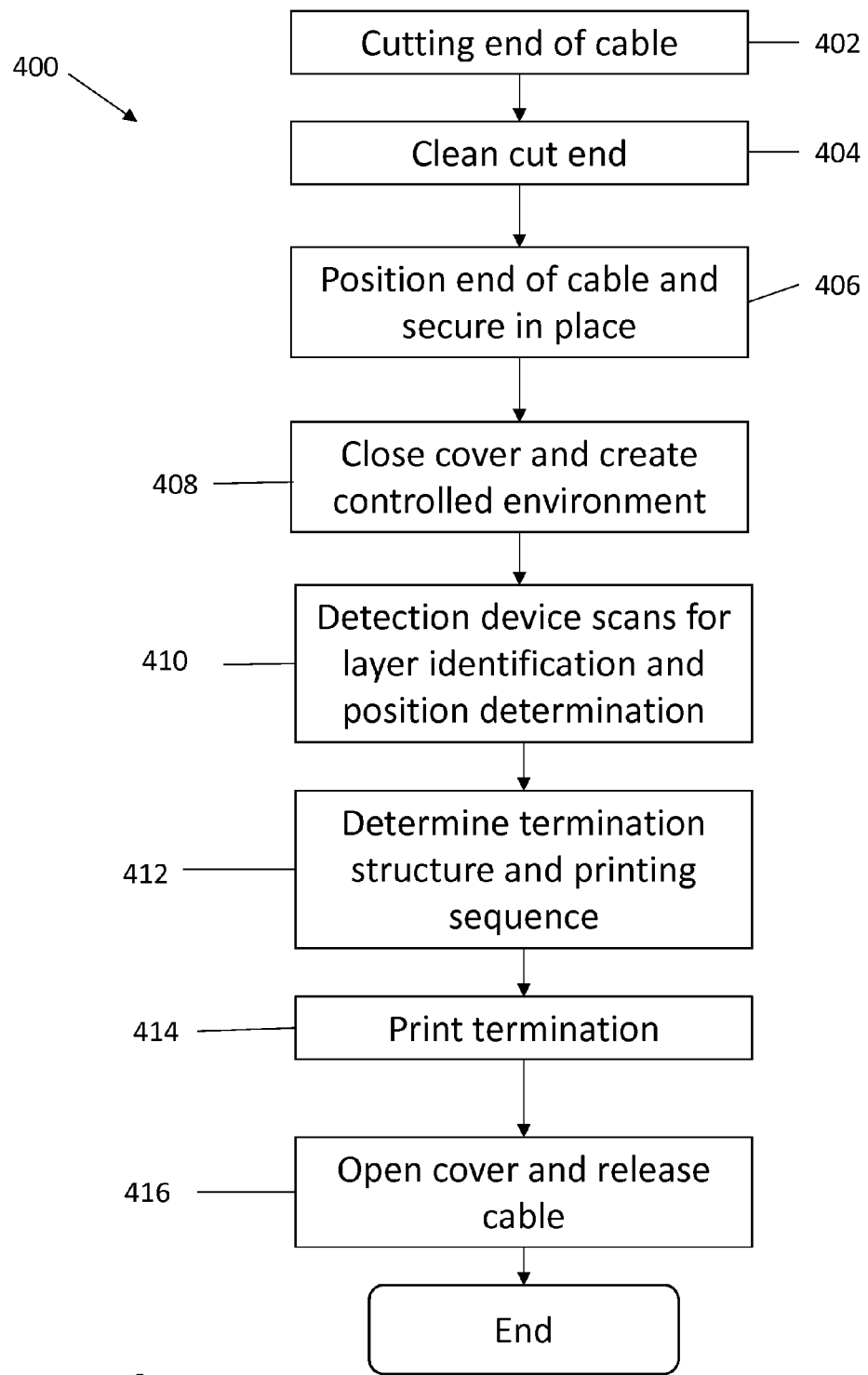
FIG. 4 illustrates a process 400 for additively manufacturing a termination 350.

With reference to FIG. 4, an additive manufacturing cable termination process 400 according to the present teachings can include step 402, which includes cutting the end 309 of the cable 304, thereby forming a face 308 upon which the termination 350 will be printed. In step 404, the end 308 is cleaned with a suitable cleaner. In step 406, the end 309 can be positioned and secured with the securing member 126. In step 408, cover 113 is closed, forming the printing chamber 112. A controlled environment is provided within chamber 112, for example by purging atmospheric air and replacing with non-oxidizing inert gas such as nitrogen or argon gas.

In step 410 the detection device 130 scans the face 108 of the cable 104 to identify the various layers present in the cable 104 and their positions. In step 412, the controller 132, based on the information gathered in step 410, determines the composition and location of material to be printed in termination 350, and the printing sequence resulting in each incremental deposit of material. In step 414, the build heads 102 can print the termination 350 on face 108 and surrounding cable end 309. According to one aspect of the present teachings, the build heads 102 first print the stress cone 364, and then the insulation 366, followed by the collar 360 and pressure ring 362. In step 416, after the termination 350 has been completely printed, the cover 113 is opened and the end 309 including the printed termination 350 is released from securing member 126.

In the present disclosure, reference numerals followed by alphabetic indices refer to one of the illustrated elements, while use of the reference numeral without the alphabetic indices refer to one or more of the illustrated elements. For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

The description of various embodiments and the details of those embodiments is illustrative and is not intended to restrict or in any way limit the scope of the claimed invention to those embodiments and details. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention.

The invention claimed is:

1. A method of splicing a conductor, comprising:
   securing a first end of a cable to a first securing member;
   securing a second end of a second cable to a second securing member;
   forming a first face on the first cable;
   forming a second face on the second cable;
   scanning at least one of the first face and the second face; and
   additively manufacturing, using information from the scanning of the at least one of the first face and the second face, a splice portion between first face and second face.

2. The method of claim 1, wherein the step of additively manufacturing a splice portion includes determining materials in at least one of the first face and second face and a position of the materials in the at least one of the first face and second face.

3. The method of claim 2, wherein the step of additively manufacturing a splice portion includes determining a printing sequence for printing the splice portion.

4. The method of claim 3, wherein the step of determining a printing sequence for the splice portion includes receiving a three-dimensional model of the splice portion.

5. The method of claim 1, wherein the step of additively manufacturing a splice portion includes additively manufacturing a conductor of the splice portion based on a three-dimensional model of the splice portion.

6. The method of claim 1, further comprising:
   rotationally orienting at least one of the first end and second end.

7. The method of claim 1, further comprising:
   cutting at least one of the first end and second end to form at least one of the first face and second face.

8. The method of claim 1, further including the step of mapping, using information from the scanning step, a position of a plurality of layers of at least one of the first cable and the second cable.

9. The method of claim 1, further including the step of determining, from information obtained from the scanning of at least one of the first face and the second face, a material for each of a plurality of layers of at least one of the first cable and the second cable.

10. The method of claim 1, wherein the scanning step comprises scanning both the first face and the second face.

11. The method of claim 10, further including the step of determining, using at least information obtained from scanning the first face and the second face, if there is a difference in at least one of a size and a radial position between one or more portions of the first cable at the first face and one or more portions of the second cable at the second face.

12. The method of claim 11, further including the step of forming, using additive manufacturing, a transition portion in the splice portion to accommodate for a determined difference between one or more portions of the first face and one or more portions of the second face.

13. The method of claim 1, further including the steps of:
   detecting, during the step of additively manufacturing the splice portion, a defect in one or more portions of the splice portion;
   removing from the splice portion a defect portion that includes the detected defect; and
   reforming, using additive manufacturing, a replacement portion in the splice portion at the location from which the defect portion was removed from the splice portion.

* * * * *